(12) United States Patent
Hessell et al.

(10) Patent No.: US 8,543,253 B2
(45) Date of Patent: Sep. 24, 2013

(54) TRANSITIONING A CONTROL SYSTEM BETWEEN CHANGING STATE EQUATIONS

(75) Inventors: Steven M. Hessell, Clarkston, MI (US); R. Anthony Hansen, Redford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 325 days.

(21) Appl. No.: 13/021,821

(22) Filed: Feb. 7, 2011

(65) Prior Publication Data
US 2012/0203395 A1  Aug. 9, 2012

(51) Int. Cl.
*B60W 20/00* (2006.01)
*G06F 17/00* (2006.01)

(52) U.S. Cl.
USPC .................................. 701/1; 701/54

(58) Field of Classification Search
USPC ...................... 701/1, 52, 54, 67, 68
See application file for complete search history.

(56) References Cited

U.S. PATENT DOCUMENTS

| | | | | |
|---|---|---|---|---|
| H2031 H * | 6/2002 | Harrell et al. | ................... | 701/68 |
| 2009/0118936 A1* | 5/2009 | Heap et al. | ....................... | 701/54 |
| 2011/0251766 A1* | 10/2011 | Schang et al. | .................. | 701/67 |
| 2011/0295476 A1* | 12/2011 | Ellis | ................................. | 701/67 |
| 2012/0158257 A1* | 6/2012 | Stursa et al. | .................... | 701/52 |

* cited by examiner

*Primary Examiner* — Tan Q Nguyen
(74) *Attorney, Agent, or Firm* — Quinn Law Group, PLLC

(57) ABSTRACT

A method of controlling a vehicle changing operating ranges from a first range to a second range includes defining a current set of state equations and a target set of state equations. The current set of state equations and the target set of state equations may each include a set of control state equations for controlling the vehicle and a set of estimator state equations for estimating the performance of the vehicle. The values of the current set of state equations are incrementally adjusted over time until substantially equal to values of the target set of state equations to smooth the requested change between the first range and the second range.

16 Claims, 3 Drawing Sheets

TRANSITIONING A CONTROL SYSTEM BETWEEN CHANGING STATE EQUATIONS

TECHNICAL FIELD

The invention generally relates to a method of transitioning a control system of a vehicle between two different operational ranges described by different state equations in real time.

BACKGROUND

Vehicles may operate in different ranges. For example, a transmission may operate in a first range when a clutch is engaged, and may operate in a second range when the clutch is disengaged. The operation of the vehicle may be controlled by a state based tracking control system, i.e., an operating condition based control system. The state based tracking control system incorporates several different state equations that model the "state", i.e., the operation of the vehicle and/or component, when operating in each of the specific operating ranges. Each range includes a set of state equations that the state based tracking control system uses to track and/or estimate the performance of the vehicle and/or component, i.e., a set of estimator state equations, and a second set of state equations that are used to control the vehicle, i.e., a set of control state equations. The state equations may include a state output value from each of the state equations. The control system may compare the state output value to a reference value, i.e., a target value for that specific linear equation. The difference between the reference value and the state output value is used to determine how to control the vehicle and/or component. Additionally, estimates or output values from one or more of the state equations may be used to calculate the different reference values.

When the vehicle changes operation from one range to another, for example when the transmission changes from operating with a clutch engaged to operating with the clutch disengaged, the state based tracking control system switches between the different set of state equations for the different operating ranges, and more specifically changes between different state equations used to predict and/or control the operation of the vehicle and/or component in the different ranges. When the state based tracking control system changes state equations in real time when changing between ranges, a difference between the state equations of the first range and the state equations of the second range may cause a sudden jump in control of the vehicle and/or components.

SUMMARY

A method of transitioning a control system of a vehicle is provided. The method includes detecting a requested transition in the operation of the vehicle between one of a first range and a second range to the other of the first range and the second range. At least one state equation that describes the one of the first range and the second range in which the vehicle is currently operating in is selected as a current state equation. The current state equation may include a set of current state equations. The set of current state equations may include a set of control state equations for controlling the vehicle, and a set of estimator state equations for estimating the performance of the vehicle. At least one state equation that describes the one of the first range and the second range that the vehicle is transitioning into is selected as a target state equation. The target state equation may include a set of control state equations for controlling the vehicle, and a set of estimator state equations for estimating the performance of the vehicle. The method further includes blending values of the current state equation over time until the blended values are substantially equal to values of the target state equation to smooth the requested transition between the first range and the second range.

A method of transitioning a control system of a vehicle is also provided. The method includes detecting a requested transition in the operation of the vehicle between one of a first range and a second range to the other of the first range and the second range. At least one reference value and at least one state output value of a current set of state equations that describe the range in which the vehicle is currently operating in are selected. The current set of state equations may include a set of control state equations for controlling the vehicle, and a set of estimator state equations for estimating the performance of the vehicle. At least one reference value and at least one state output value of a target set of state equations that describe the range that the vehicle is transitioning into are selected. The target set of state equations may include a set of control state equations for controlling the vehicle, and a set of estimator state equations for estimating the performance of the vehicle. A difference between the at least one reference value of the current set of state equations and the at least one reference value of the target set of state equations is multiplied by a multiplier to define a reference product. The reference product is summed with the at least one reference value of the current set of state equations to define an adjusted reference value. A difference between the at least one state output value of the current set of state equations and the at least one state output value of the target set of state equations is multiplied by the multiplier to define a state product. The state product is summed with the at least one state output value of the current set of state equations to define an adjusted state output value. The method further includes comparing the adjusted reference value and the adjusted state output value to the at least one reference value and the at least one state output value of the target set of state equations respectively to determine if the adjusted reference value and the adjusted state output value are greater than, equal to or less than a pre-defined percentage of the at least one reference value and the at least one state output value of the target set of state equations respectively. The adjusted reference value and the adjusted state output value are recalculated when the adjusted reference value and the adjusted state output value are less than a pre-defined percentage of the at least one reference value and the at least one state output value of the target set of state equations respectively until the adjusted reference value and the adjusted state output value are equal to or greater than the pre-defined percentage of the at least one reference value and the at least one state output value of the target set of state equations respectively to smooth the requested change between the first range and the second range.

Accordingly, the values of the current set of state equations are ramped up or down until they are substantially equal to the values of the target set of state equations, thereby smoothing the transition between the first range and the second range and minimizing and/or eliminating any felt jump in the vehicle. The current state equations and the target state equations may each include a set of control state equations for controlling the vehicle, and a set of estimator state equations for estimating the performance of the vehicle. The set of control state equations and the set of estimator state equations may be blended individually or simultaneously.

The above features and advantages and other features and advantages of the present invention are readily apparent from

DETAILED DESCRIPTION

Figure 1:
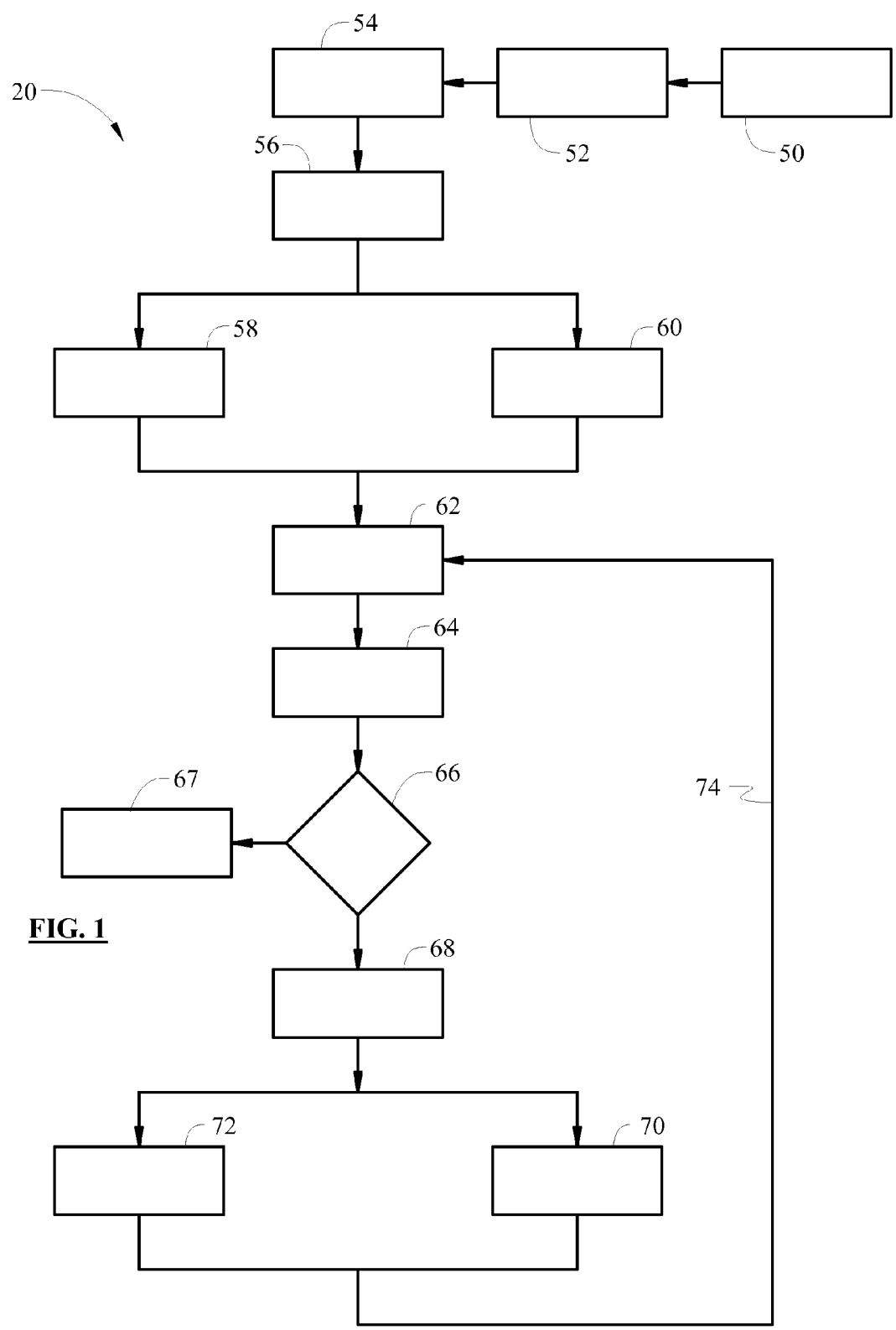
FIG. 1 is a flow chart showing a method of non-linearly transitioning a control system of a vehicle between two different operating ranges of the vehicle.
Figure 2:
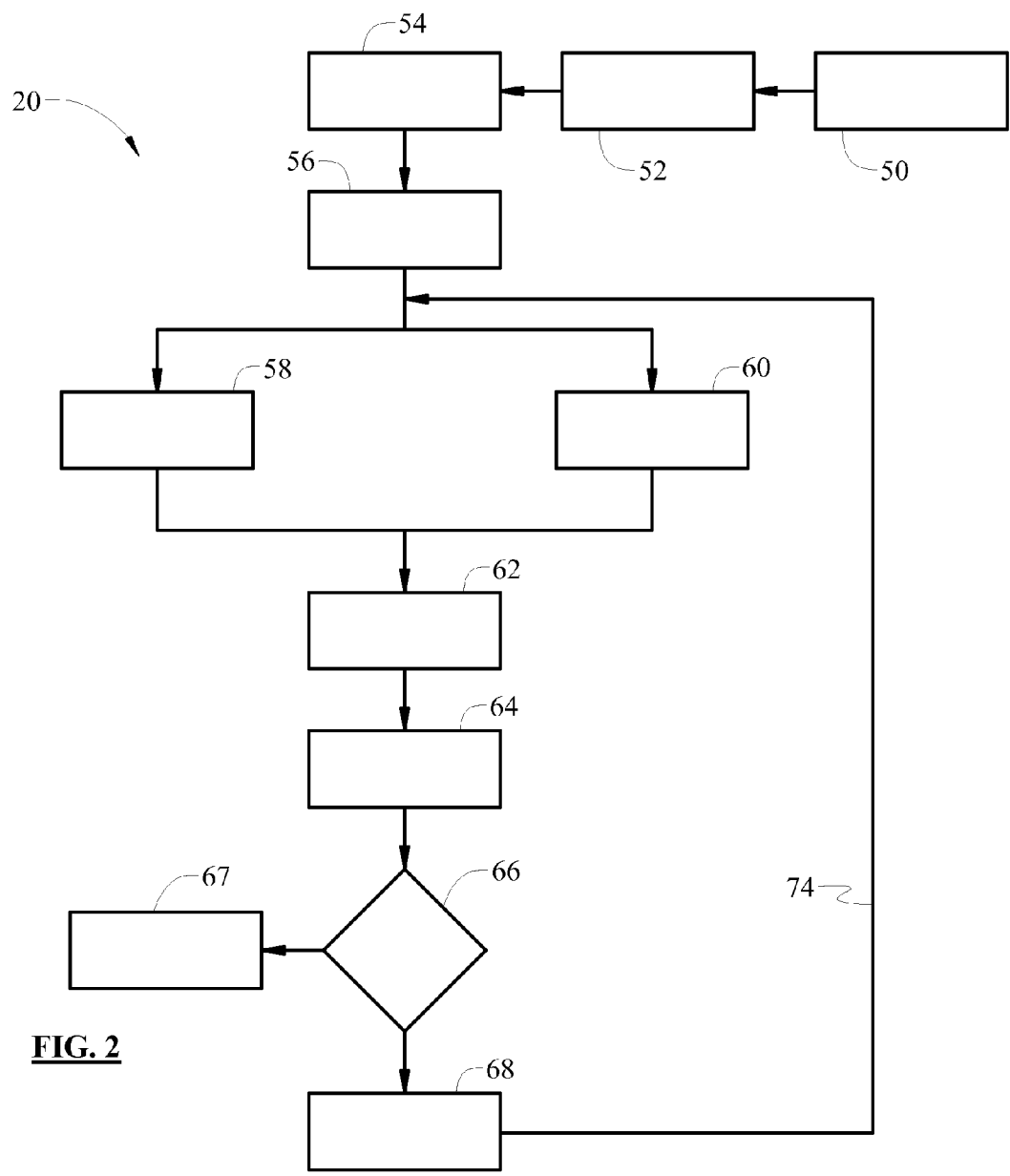
FIG. 2 is a flow chart showing an alternative method of linearly transitioning the control system of the vehicle between two different operating ranges of the vehicle.

Referring to the Figures, wherein like numerals indicate like parts throughout the several views, a method of controlling a vehicle is shown generally at 20 in FIGS. 1 and 2. The method may be embodied as an algorithm operable on a vehicle controller or the like.

Figure 3:
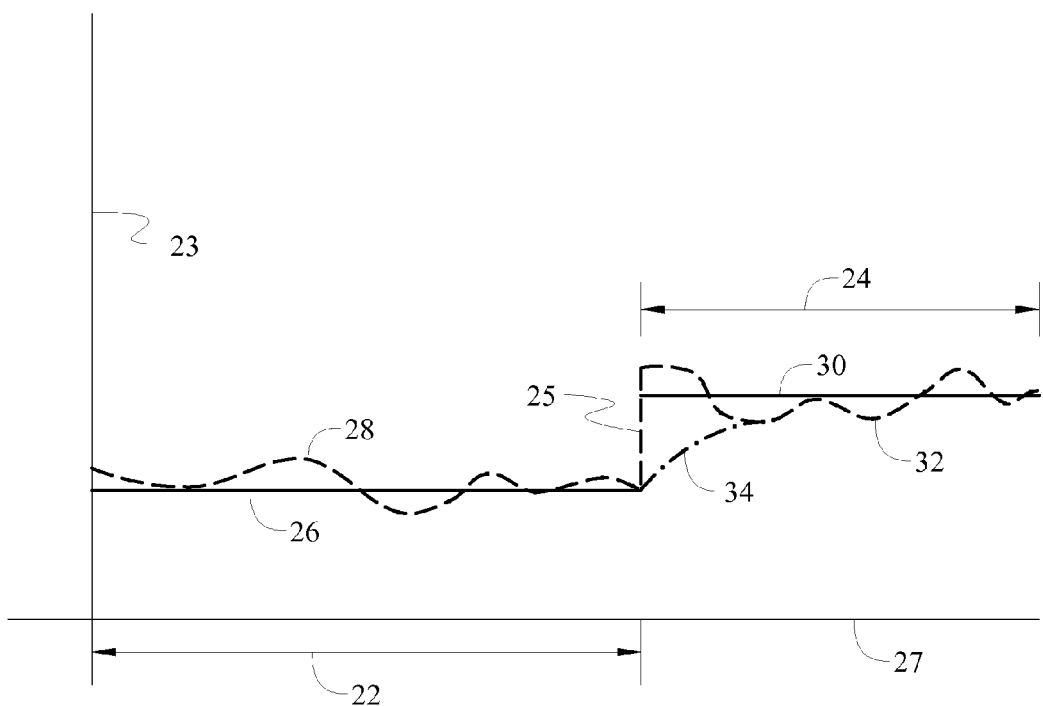
FIG. 3 is a chart showing a first set of state equations for describing the operation of a vehicle in a first range, a second set of state equations for describing the operation of the vehicle in a second range, and how the state equations are blended when operation of the vehicle is transitioned from the first range to the second range.

Referring to FIG. 3, the vehicle, or a component of the vehicle, operates in at least a first range, generally indicated at 22, and a second range, generally indicated at 24. For example, a transmission may operate in the first range 22 when a clutch is engaged, and may operate in the second range 24 when the clutch is disengaged. It should be appreciated that the first range 22 and the second range 24 may include any different operating ranges of the vehicle or a component of the vehicle. It should also be appreciated that the vehicle may include several different operating ranges, and that the first range 22 and the second range 24 may include any two of the several different operating ranges of the vehicle. Accordingly, it should be appreciated that the first range 22 and the second range 22 are not limited to the exemplary embodiment of the clutch described above.

A current state equation describes and/or controls the operation of the vehicle in one of the first range and the second range in which the vehicle is currently operating in. The current state equation may include a set of state equations. The set of state equations may include a set of control state equations for controlling the vehicle, and a set of estimator state equations for estimating the performance of the vehicle. The current set of state equations may include but is not limited to at least one reference value 26 and at least one state output value 28. The state output value 28 is an output generated from a linear equation that models the operation of the vehicle and/or component. As such, the state output value 28 describes the operation, i.e., the state, of the vehicle and/or the component when the vehicle and/or component is operating in the first range 22.

A target state equation describes and/or controls the operation of the vehicle in the one of the first range and the second range that the vehicle is transitioning into. The target state equation may include a set of state equations. The set of state equations may include a set of control state equations for controlling the vehicle, and a set of estimator state equations for estimating the performance of the vehicle. The target set of state equations may include but is not limited to at least one reference value 30 and at least one state output value 32. The state output value 32 is an output generated from a linear equation that models the operation of the vehicle and/or component. As such, the state output value 32 describes the operation, i.e., the state, of the vehicle and/or the component when the vehicle and/or component is operating in the second range 24.

A vehicle controller may reference a difference between the reference values 26, 30 and the state output values 28, 32 to determine how to control the vehicle and/or component. Accordingly, the controller continuously solves the state equations for the respective ranges to predict the operation of the vehicle and/or component, and compares the state output values 28, 32 from the linear equations to the reference values 26, 30 to determine how to control or adjust the vehicle and/or component. The reference value 26 for the first range 22 includes a value that is different from a value of the reference value 30 for the second range 24. The differing values or magnitude of the reference value 26, 30 of the first range 22 and the second range 24 respectively are generally indicated along the vertical axis 23 shown in FIG. 3. Similarly, a value of the state output value 28 for the first range 22 is different from a value of the state output value 32 for the second range 24. The differing values or magnitude of the state output value 28, 32 of the first range 22 and the second range 24 respectively are also generally indicated along the vertical axis 23 shown in FIG. 3. Accordingly, an abrupt change, generally indicated at 25, occurs between the reference value 26, 30 and the state output value 28, 32 of the first range 22 and the second range 24 respectively when the vehicle and/or component transitions between the first range 22 and the second range 24. In order to smooth the transition between the first range 22 and the second range 24, the reference values 26, 30 and the state output values 28, 32 are ramped over time, i.e., blended, generally indicated by the dashed-dot line 34, to eliminate or minimize the abrupt change between the value of the reference value 26 in of the first range 22 and the value of the reference value 30 in the second range 24, as well as to eliminate or minimize the abrupt change between the value of the state output value 28 of the first range 22 and the state output value 32 of the second range 24. The time over which the reference values 26, 30 and the state output values 28, 32 are ramped is generally indicated along the horizontal axis 27 shown in FIG. 3. The time period is calibratable and may be defined to equal any desirable time duration for the specific vehicle and/or operating ranges.

Referring also to FIGS. 1 and 2, the method includes detecting a requested change in the operation of the vehicle from one of the first range 22 and the second range 24 to the other of the first range 22 and the second range 24, and/or identifying a range change complete flag as being equal to false, generally shown as block 50. The range change complete flag is a variable referenced by the vehicle controller to determine if blending of the current set of state equations is complete, i.e., flag is equal to true, or is not complete, i.e., flag is equal to false. As conditions dictate, the vehicle controller may signal that the vehicle and/or component switch between the first range 22 and the second range 24. This may include switching from the first range 22 to the second range 24, as is shown in FIG. 3, or may oppositely include switching from the second range 24 to the first range 22. For example, the vehicle controller may signal a clutch in a transmission of the vehicle to switch from a first range 22, e.g., engaged, to a second range 24, e.g., disengaged, thereby changing the operation of the transmission from the first range 22 to the second range 24. The requested change in operation of the vehicle may be detected in any suitable manner, including but not limited to identifying a control signal from the vehicle controller or detecting movement of a component, switch, valve, etc., that would cause a change from the first range 22 to the second range 24.

The method further includes selecting, i.e., defining, at least one state equation that currently describes the range in which the vehicle is currently operating in as the current set of state equations, generally shown as block 52. As shown in FIG. 3 and described herein, the current set of state equations defines the reference value 26 and the state output value 28 for the first range 22. The method further includes selecting, i.e. defining, at least one state equation that describes the range in which the vehicle is transitioning into as a target set of state equations, generally shown as block 54. As shown in FIG. 3 and described herein, the target set of state equations include the reference value 30 and the state output value 32 for the second range 24.

The method further includes blending values of the current set of state equations 26, 28 over time until substantially equal to values of the target set of state equations, 30, 32. Blending the values of the current set of state equations 26, 28 until substantially equal to the values of the target set of state equations 30, 32 smoothes the abrupt change 25, i.e., difference, between the current set of state equations 26, 28 and the target set of state equations 30, 32. By smoothing the difference between the current set of state equations 26, 28 and the target set of control variable 30, 32, the transition between the current range 22 and the target range 24 is smoothed.

In order to blend the values of the current set of state equations 26, 28, the method further includes defining a multiplier, generally shown at block 56. The multiplier may be defined to include any value greater than zero (0) and equal to or less than one (1). A larger value of the multiplier will transition the current set of state equations faster than a smaller value of the multiplier.

The current set of state equations 26, 28 may be blended linearly or non-linearly. Referring to FIGS. 1 and 3, if the current set of state equations 26, 28 are blended non-linearly, as shown in FIG. 3, then blending the values of the current set of state equations 26, 28 further includes multiplying a difference between the reference value 26 of the current set of state equations and the reference value 30 of the target set of state equations by the multiplier to define a reference product. Accordingly, the reference value 26 of the current set of state equations is subtracted from the reference value 30 of the target set of state equations, and the calculated difference is multiplied by the multiplier to define the reference product. The reference product is then summed with, i.e., added to, the reference value 26 of the current set of state equations to define an adjusted reference value, generally shown as block 58.

Similarly, blending values of the current set of state equations 26, 28 includes multiplying a difference between the state output value 28 of the current set of state equations and the state output value 32 of the target set of state equations by the multiplier to define a state product. Accordingly, the state output value 28 of the current set of state equations is subtracted from the state output value 32 of the target set of state equations, and the calculated difference is multiplied by the multiplier to define the state product. The state product is then summed with, i.e., added to, the state output value 28 of the current set of state equations to define the adjusted state output value, generally shown as block 60.

The method further includes comparing the adjusted reference value and the adjusted state output value to the reference value 30 and the state output value 32 of the target set of state equations respectively to determine if the adjusted reference value and the adjusted state output value are less than, equal to or greater than a pre-defined percentage of the reference value 30 and the state output value 32 of the target set of state equations respectively, generally shown as block 62. The pre-defined percentage may be defined as any percentage, but is preferably defined to equal ninety nine percent (99%).

The method further includes defining the range change complete flag, generally shown as block 64. The range change complete flag is defined to equal false when the adjusted reference value and the adjusted state output value are less than the pre-defined percentage of the reference value 30 and the state output value 32 of the target set of state equations respectively. The range change complete flag is defined to equal true when the adjusted reference value and the adjusted state output value are equal to or greater than the pre-defined percentage of the reference value 30 and the state output value 32 of the target set of state equations respectively.

The method further includes determining if the range change complete flag is equal to true or false, generally shown as block 66. When the range change complete flag is equal to false, i.e., if the adjusted reference value and the adjusted state output value are less than the pre-defined percentage of the reference value 30 and the state output value 32 of the target set of state equations respectively, then the method further includes increasing a value of the multiplier, generally shown as block 68. The value of the multiplier is increased within the range of zero (0) and (1) in accordance with a calibratable rate. As such, the calibratable rate defines the magnitude of increase in value of the multiplier. The calibratable rate may be set to any desired and acceptable rate of change of the multiplier to provide a smooth transition between the first range 22 and the second range 24. For example, the calibratable rate may control the rate of change of the multiplier to equal a ten percent (10%) increase in the value of the multiplier. The calibratable rate may define, but is not limited to, a linear increase, an exponential increase or a curvilinear increase in the value of the multiplier over one or more iterations of the increase of the value of the multiplier.

The method further includes multiplying a difference between the adjusted reference value and the reference value 30 of the target set of state equations by the increased multiplier to re-define the reference product, generally shown as block 70. Accordingly, the adjusted reference value is subtracted from the reference value 30 of the target set of state equations, and the calculated difference is multiplied by the increased multiplier to re-define the reference product. The re-defined reference product is then summed with, i.e., added to, the adjusted reference value to define a new adjusted reference value.

Similarly, the method further includes multiplying a difference between the adjusted state output value and the state output value 32 of the target set of state equations by the increased multiplier to re-define the state product, generally shown as block 72. The re-defined state product is then summed with, i.e., added to, the adjusted state output value to define a new adjusted state output value.

The method further includes repeating the iterative process, generally indicated at 74, until the range change complete flag is equal to true. More specifically, the adjusted reference value and the adjusted state output value are compared, block 62, to the reference value 30 and the state output value 32 of the target set of state equations for each incremental increase in the multiplier to determine if the adjusted reference value and the adjusted state output value is less than, equal to or greater than the pre-defined percentage of the reference value 30 and the state output value 32 of the target set of state equations, and the range change complete flag is re-defined based upon the comparison, block 64. If the adjusted reference value and the adjusted state output value continue to be less than the pre-defined percentage of the reference value 30 and the state output value 32 of the target set of state equations, block 66, then the value of the multiplier is increased, block 68, in accordance with the calibratable rate and another new adjusted reference value and new adjusted state output value are calculated, blocks 70 and 72. The iterative process 74 continues until the range change complete flag is equal to true. If the adjusted reference value and the adjusted state output value are equal to or greater than the pre-defined percentage of the reverence value 30 and the state output value 32 of the target set of state equations, indicated at block 67, then the transition is complete and the algorithm ends.

Referring to FIGS. 2 and 3, if the current set of state equations 26, 28 are blended linearly, then blending the values of the current set of state equations 26, 28 further includes multiplying a difference between the reference value 26 of the current set of state equations and the reference value 30 of the target set of state equations by the multiplier to define a reference product. Accordingly, the reference value 26 of the current set of state equations is subtracted from the reference value 30 of the target set of state equations, and the calculated difference is multiplied by the multiplier to define the reference product. The reference product is then summed with, i.e., added to, the reference value 26 of the current set of state equations to define an adjusted reference value, generally shown as block 58.

Similarly, blending values of the current set of state equations 26, 28 includes multiplying a difference between the state output value 28 of the current set of state equations and the state output value 32 of the target set of state equations by the multiplier to define a state product. Accordingly, the state output value 28 of the current set of state equations is subtracted from the state output value 32 of the target set of state equations, and the calculated difference is multiplied by the multiplier to define the state product. The state product is then summed with, i.e., added to, the state output value 28 of the current set of state equations to define the adjusted state output value, generally shown as block 60.

The method further includes comparing the adjusted reference value and the adjusted state output value to the reference value 30 and the state output value 32 of the target set of state equations respectively to determine if the adjusted reference value and the adjusted state output value are less than, equal to or greater than a pre-defined percentage of the reference value 30 and the state output value 32 of the target set of state equations respectively, generally shown as block 62. The pre-defined percentage may be defined as any percentage, but is preferably defined to equal ninety nine percent (99%).

The method further includes defining the range change complete flag, generally shown as block 64. The range change complete flag is defined to equal false when the adjusted reference value and the adjusted state output value are less than the pre-defined percentage of the reference value 30 and the state output value 32 of the target set of state equations respectively. The range change complete flag is defined to equal true when the adjusted reference value and the adjusted state output value are equal to or greater than the pre-defined percentage of the reference value 30 and the state output value 32 of the target set of state equations respectively.

The method further includes determining if the range change complete flag is equal to true or false, generally shown as block 66. When the range change complete flag is equal to false, i.e., if the adjusted reference value and the adjusted state output value are less than the pre-defined percentage of the reference value 30 and the state output value 32 of the target set of state equations respectively, then the method further includes increasing a value of the multiplier, generally shown as block 68. The value of the multiplier is increased within the range of zero (0) and (1) in accordance with the calibratable rate as described above.

For linear adjustment of the current set of state equations, 26, 28, the method further includes recalculating the adjusted reference value. The adjusted reference value is recalculated by multiplying the difference between the reference value 26 of the current set of state equations and the reference value 30 of the target set of state equations by the increased multiplier to re-define the reference product. Accordingly, the reference value 26 of the current set of state equations is subtracted from the reference value 30 of the target set of state equations, and the calculated difference is multiplied by the increased multiplier to re-define the reference product. The re-defined reference product is then summed with, i.e., added to, the reference value 26 of the current set of state equations to re-define the adjusted reference value, generally shown as block 58.

Similarly, blending values of the current set of state equations 26, 28 includes multiplying the difference between the state output value 28 of the current set of state equations and the state output value 32 of the target set of state equations by the increased multiplier to re-define the state product. Accordingly, the state output value 28 of the current set of state equations is subtracted from the state output value 32 of the target set of state equations, and the calculated difference is multiplied by the increased multiplier to re-define the state product. The re-defined state product is then summed with, i.e., added to, the state output value 28 of the current set of state equations to re-define the adjusted state output value, generally shown as block 60.

The method further includes repeating the iterative process, generally indicated at 74, until the range change complete flag is equal to true. More specifically, the adjusted reference value and the adjusted state output value are compared, block 62, to the reference value 30 and the state output value 32 of the target set of state equations for each incremental increase in the multiplier to determine if the adjusted reference value and the adjusted state output value is less than, equal to or greater than the pre-defined percentage of the reference value 30 and the state output value 32 of the target set of state equations, and the range change complete flag is re-defined based upon the comparison, block 64. If the adjusted reference value and the adjusted state output value continue to be less than the pre-defined percentage of the reference value 30 and the state output value 32 of the target set of state equations, block 66, then the value of the multiplier is increased, block 68, in accordance with the calibratable rate, and another new adjusted reference value and new adjusted state output value are calculated, blocks 58 and 60. The iterative process 74 continues until the range change complete flag is equal to true. If the adjusted reference value and the adjusted state output value are equal to or greater than the pre-defined percentage of the reference value 30 and the state output value 32 of the target set of state equations, indicated at block 67, then the transition is complete and the algorithm ends.

While the best ranges for carrying out the invention have been described in detail, those familiar with the art to which this invention relates will recognize various alternative designs and embodiments for practicing the invention within the scope of the appended claims.

The invention claimed is:

1. A method of transitioning a control system of a vehicle, the method comprising;

detecting a requested transition in the operation of the vehicle between one of a first range and a second range to the other of the first range and the second range;

selecting at least one state equation that currently describes the one of the first range and the second range in which the vehicle is currently operating in as a current state equation;

selecting at least one state equation that describes the one of the first range and the second range that the vehicle is transitioning into as a target state equation;

wherein the current state equation includes at least one reference value and at least one state output value that describes the operation of the vehicle when in the first range, and wherein the target state equation includes at least one reference value and at least one state output value that describes the operation of the vehicle when in the second range;

defining a multiplier to adjust the values of the current state equation over time; and blending values of the current state equation over time until the blended values are substantially equal to values of the target state equation to smooth the requested transition between the first range and the second range;

wherein blending values of the current state equation over time until substantially equal to values of the target state equation includes A) multiplying a difference between the at least one reference value of the current state equation and the at least one reference value of the target state equation by the multiplier to define a reference product, and summing the reference product with the at least one reference value of the current state equation to define an adjusted reference value.

2. A method as set forth in claim 1 wherein the at least one state output value of the current state equation and the at least one state output value of the target state equation are each generated by at least one linear equation that models the operation of the vehicle when in the first range and the second range respectively.

3. A method as set forth in claim 1 wherein blending values of the current state equation over time until substantially equal to values of the target state equation includes B) multiplying a difference between the at least one state output value of the current state equation and the at least one state output value of the target state equation by the multiplier to define a state product, and summing the state product with the at least one state output value of the current state equation to define an adjusted state output value.

4. A method as set forth in claim 3 wherein blending values of the current state equation over time until substantially equal to values of the target state equation includes C) comparing the adjusted reference value and the adjusted state output value to the at least one reference value and the at least one state output value of the target state equation respectively to determine if the adjusted reference value and the adjusted state output value are greater than a pre-defined percentage of the at least one reference value and the at least one state output value of the target state equation respectively.

5. A method as set forth in claim 4 wherein blending values of the current state equation over time until substantially equal to values of the target state equation includes D) defining a range change complete flag to equal false when the adjusted reference value and the adjusted state output value are less than the pre-defined percentage of the at least one reference value and the at least one state output value of the target state equation respectively, and defining the range change complete flag to equal true when the adjusted reference value and the adjusted state output value are equal to or greater than the pre-defined percentage of the at least one reference value and the at least one state output value of the target state equation respectively.

6. A method as set forth in claim 5 wherein blending values of the current state equation over time until substantially equal to values of the target state equation includes E) increasing a value of the multiplier when the range change complete flag is equal to false.

7. A method as set forth in claim 6 wherein a calibratable rate defines the magnitude of increase in value of the multiplier.

8. A method as set forth in claim 6 wherein blending values of the current state equation over time until substantially equal to values of the target state equation includes F) multiplying a difference between the adjusted reference value and the at least one reference value of the target state equation by the increased multiplier to re-define the reference product, and summing the re-defined reference product with the adjusted reference value to define a new adjusted reference value.

9. A method as set forth in claim 8 wherein blending values of the current state equation over time until substantially equal to values of the target state equation includes G) multiplying a difference between the adjusted state output value and the at least one state output value of the target state equation by the increased multiplier to re-define the state product, and summing the state product with the adjusted state output value to define a new adjusted state output value.

10. A method as set forth in claim 9 wherein blending values of the current state equation over time until substantially equal to values of the target state equation includes repeating steps A, B, C, D and E to linearly adjust the current state equation until the range change complete flag is equal to true.

11. A method as set forth in claim 9 wherein blending values of the current state equations over time until substantially equal to values of the target state equation includes repeating steps C, D, E, F and G to non-linearly adjust the current state equation until the range change complete flag is equal to true.

12. A method of transitioning a control system of a vehicle, the method comprising;

detecting a requested transition in the operation of the vehicle between one of a first range and a second range to the other of the first range and the second range;

selecting at least one reference value and at least one state output value of a current set of state equations that describe the one of the first range and the second range in which the vehicle is currently operating in;

selecting at least one reference value and at least one state output value of a target set of state equations that describe the one of the first range and the second range that the vehicle is transitioning into;

multiplying a difference between the at least one reference value of the current set of state equations and the at least one reference value of the target set of state equations by a multiplier to define a reference product, and summing the reference product with the at least one reference value of the current set of state equations to define an adjusted reference value;

multiplying a difference between the at least one state output value of the current set of state equations and the at least one state output value of the target set of state equations by the multiplier to define a state product, and summing the state product with the at least one state output value of the current set of state equations to define an adjusted state output value;

comparing the adjusted reference value and the adjusted state output value to the at least one reference value and the at least one state output value of the target set of state equations respectively to determine if the adjusted reference value and the adjusted state output value are greater than, equal to or less than a pre-defined percentage of the at least one reference value and the at least one state output value of the target set of state equations respectively; and recalculating the adjusted reference value and the adjusted state output value when the adjusted reference value and the adjusted state output value are less than a pre-defined percentage of the at least one reference value and the at least one state output value of the target set of state equations respectively until the adjusted reference value and the adjusted state output value are equal to or greater than the pre-defined percentage of the at least one reference value and the at least one state output value of the target set of state equations respectively to smooth the requested change between the first range and the second range.

13. A method as set forth in claim 12 wherein recalculating the adjusted reference value includes multiplying a difference between the adjusted reference value and the at least one reference value of the target set of state equations by an increased multiplier to re-define the reference product, and summing the re-defined reference product with the adjusted reference value to define a new adjusted reference value.

14. A method as set forth in claim 13 wherein recalculating the adjusted state output value includes multiplying a difference between the adjusted state output value and the at least one state output value of the target set of state equations by the increased multiplier to re-define the state product, and summing the re-defined state product with the adjusted state output value to define a new adjusted state output value.

15. A method as set forth in claim 14 wherein a calibratable rate defines a magnitude of the increase in value of the multiplier.

16. A method as set forth in claim 12 wherein recalculating the adjusted reference value and the adjusted state output value includes:

increasing the multiplier;

multiplying a difference between the at least one reference value of the current set of state equations and the at least one reference value of the target set of state equations by the increased multiplier to re-define the reference product, and summing the re-defined reference product with the at least one reference value of the current set of state equations to re-define the adjusted reference value; and multiplying a difference between the at least one state output value of the current set of state equations and the at least one state output value of the target set of state equations by the increased multiplier to re-define the state product, and summing the re-defined state product with the at least one state output value of the current set of state equations to re-define the adjusted state output value.

* * * * *